(12) United States Patent
Soo et al.

(10) Patent No.: US 11,443,510 B2
(45) Date of Patent: Sep. 13, 2022

(54) METHOD, SYSTEM AND COMPUTER PROGRAM PRODUCT THAT PROVIDES VIRTUAL ASSISTANCE IN FACILITATING VISUAL COMPARISON

(71) Applicant: MOTOROLA SOLUTIONS, INC., Chicago, IL (US)

(72) Inventors: Swee Yee Soo, Gelugor (MY); Choon Kang Wong, Ipoh (MY); Wai Seong Loh, Kampar (MY); Kuang Lin Chuang, Masai (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 65 days.

(21) Appl. No.: 16/945,969

(22) Filed: Aug. 3, 2020

(65) Prior Publication Data

US 2022/0036073 A1 Feb. 3, 2022

(51) Int. Cl.
*G06V 20/52* (2022.01)
*G06V 10/74* (2022.01)
*G06V 20/20* (2022.01)
*G06V 40/16* (2022.01)
*G06F 3/16* (2006.01)
*H04N 7/18* (2006.01)
*G06V 20/62* (2022.01)

(52) U.S. Cl.
CPC ............ *G06V 20/20* (2022.01); *G06F 3/167* (2013.01); *G06V 10/74* (2022.01); *G06V 20/52* (2022.01); *G06V 40/171* (2022.01); *G06V 40/173* (2022.01); *H04N 7/185* (2013.01); *G06V 20/625* (2022.01); *G06V 2201/10* (2022.01)

(58) Field of Classification Search
CPC ........... G06K 9/00671; G06K 9/00281; G06K 9/00295; G06F 3/167; H04N 7/185; G08B 13/19608; G06V 10/74; G06V 20/52
See application file for complete search history.

(56) References Cited

U.S. PATENT DOCUMENTS 5,091,780 A * 2/1992 Pomerleau ....... G08B 13/19602
348/262
8,837,906 B2 9/2014 May et al.
(Continued)

FOREIGN PATENT DOCUMENTS

| WO | 2019177473 | 9/2019 |
| WO | 2020204735 A1 | 10/2020 |
| WO | 2020263110 A1 | 12/2020 |

OTHER PUBLICATIONS

"ViQi Virtual Partner" by Motorola Solutions, https://www.motorolasolutions.com/content/dam/msi/images/products/apx-next/apx-next-story/assets-models/assets/documents/apx-next-viqi-virtual-partner-fact-sheet.pdf, (2019), all pages.
(Continued)

*Primary Examiner* — Rowina J Cattungal
(74) *Attorney, Agent, or Firm* — Daniel R. Bestor

(57) ABSTRACT

A method, system and computer program product that provides virtual assistance in facilitating visual comparison is disclosed. A method in accordance with example embodiments includes determining (by comparison of first metadata of an at least one user-provided image to second metadata of an at least one reference image) difference information as between an unknown object and a known object shown in the at least one user-provided image to the at least one reference image respectively.

20 Claims, 6 Drawing Sheets

(56) References Cited

U.S. PATENT DOCUMENTS

| | | | |
|---|---|---|---|
| 8,873,813 B2 | 10/2014 | Tadayon et al. | |
| 8,892,132 B2 | 11/2014 | Monks et al. | |
| 10,061,835 B2 | 8/2018 | Blanco et al. | |
| 10,628,730 B2 | 4/2020 | Whritenor et al. | |
| 10,665,088 B2 | 5/2020 | Zhao et al. | |
| 2002/0071033 A1* | 6/2002 | Gutta | G07C 9/37 348/E7.086 |
| 2002/0135483 A1* | 9/2002 | Merheim | G08B 13/19684 348/E7.09 |
| 2006/0282771 A1 | 12/2006 | Vinci | |
| 2012/0288140 A1 | 11/2012 | Hauptmann et al. | |
| 2013/0268260 A1 | 10/2013 | Lundberg et al. | |
| 2017/0076140 A1* | 3/2017 | Waniguchi | H04N 5/23218 |
| 2018/0005037 A1 | 1/2018 | Smith et al. | |
| 2018/0146169 A1* | 5/2018 | Siminoff | G08B 13/19602 |
| 2018/0157939 A1 | 6/2018 | Butt et al. | |
| 2018/0268818 A1* | 9/2018 | Schoenmackers | G10L 15/26 |
| 2018/0350354 A1 | 12/2018 | Mariaskin et al. | |
| 2018/0357870 A1* | 12/2018 | Siminoff | G08B 13/19608 |
| 2019/0122516 A1* | 4/2019 | Lorenzetti | H04N 5/772 |
| 2019/0156640 A1* | 5/2019 | Cutcher | G08B 13/19673 |
| 2019/0278976 A1* | 9/2019 | Khadloya | G08B 13/194 |
| 2019/0286901 A1 | 9/2019 | Blanco et al. | |
| 2020/0074245 A1 | 3/2020 | Koskan et al. | |
| 2020/0238952 A1* | 7/2020 | Lindsay | B60R 21/01 |
| 2020/0279381 A1* | 9/2020 | Uesugi | H04M 11/00 |
| 2020/0327347 A1* | 10/2020 | Arai | G06T 7/20 |
| 2021/0064903 A1 | 3/2021 | Lim et al. | |

OTHER PUBLICATIONS

Filip Leiding: "Stationary Object Detection in Video", Master's Thesis in Computing Science, 30 ECTS credits Supervisor: Mikael Rannar, Aug. 24, 2015, all pages.

* cited by examiner

METHOD, SYSTEM AND COMPUTER PROGRAM PRODUCT THAT PROVIDES VIRTUAL ASSISTANCE IN FACILITATING VISUAL COMPARISON

BACKGROUND

To the extent that there exists availability of video security footage, a command center of a public safety or other security entity can often quickly identify a suspect's appearance (for example, identifying the suspect using appearance search and/or other video analytics). By contrast, it can be challenging for the command center to effectively convey descriptive and identifying information about the subject of a Be On the Look Out (BOLO) to a patrolling officer searching for that subject around a city or other patrolled area. Real-time action may be called for, but the patrolling officer may be unable to immediately carry out a visual assessment of reference image(s) because, for example, he is driving a car or Sports Utility Vehicle (SUV), operating a motorbike, riding a horse, etc. Even in other cases (such as, for example, when the patrolling officer is on foot) it may still be difficult for the patrolling officer to unrestrictedly look at one or more reference images (sent to him on his two-way radio or smart phone) because, for example, the patrolling officer may feel the need to keep uninterrupted eye attention on the surroundings in support of his effort to look and search for the subject of the BOLO (this is especially true when such searching is taking place in a crowded area).

Patrolling officers normally carry a variety of different types of equipment to do their jobs. One example of a piece of equipment that may be at the patrolling officer's disposal: a sophisticated two-way radio (for example, APX NEXT™ two-way radios, sold by Motorola Solutions, and integrated with ViQi Virtual Partner™, also a Motorola Solutions product). Using the ViQi Virtual Partner™, the patrolling officer presses and holds a button on his radio (or uses a remote speaker microphone), and makes a request using natural language. Frequently-asked types of queries include drivers' licenses, license plates and vehicle identification numbers. A body camera is another example of equipment that may be available, which is a wearable video or photographic recording system, typically worn in one of three locations: on the torso, on or built into a helmet, and on or built into glasses.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
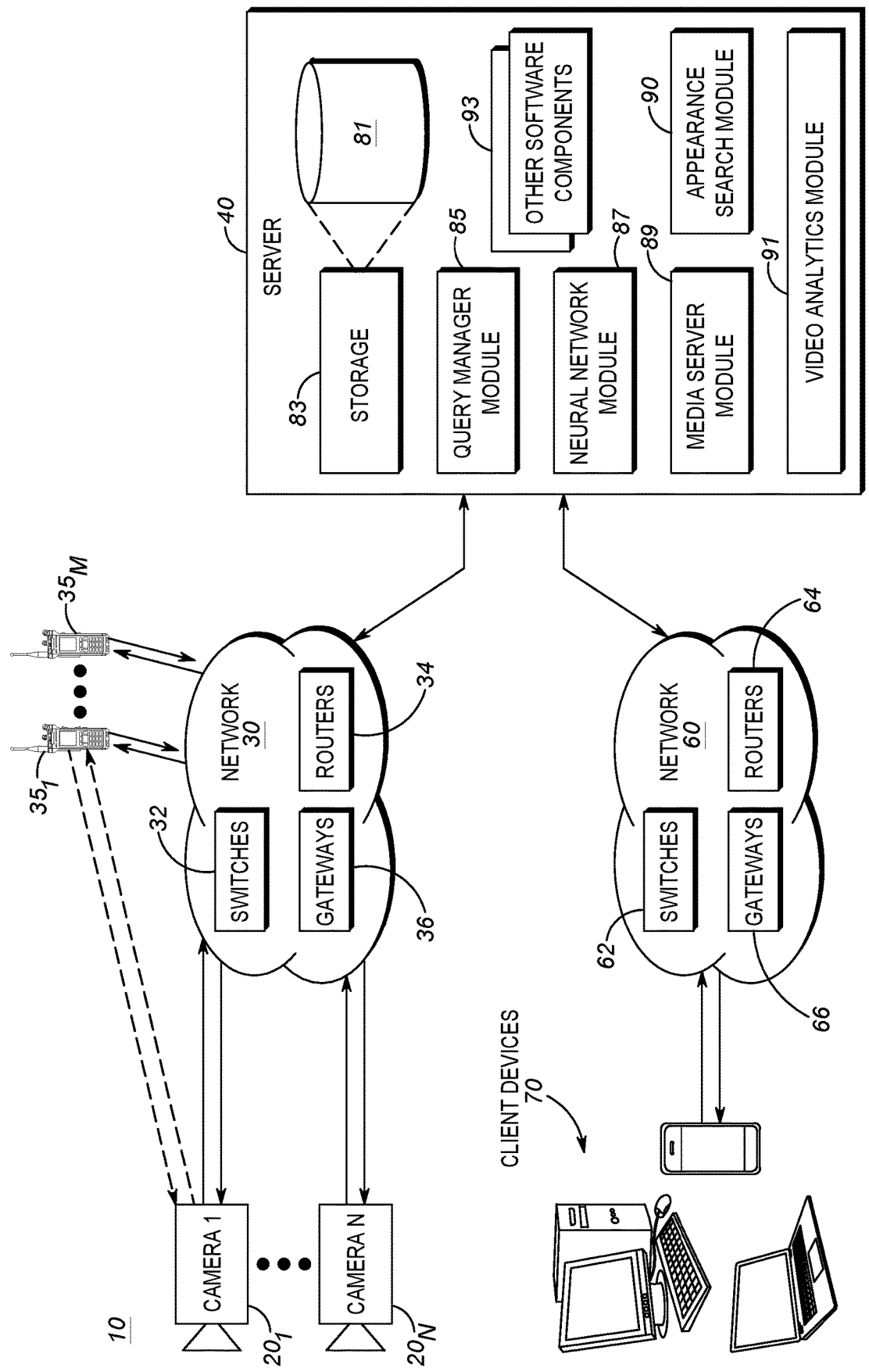
FIG. 1 is a block diagram of a system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method for providing live virtual assistance to a user of the live virtual assistance. The method includes receiving, at an at least one processor, first metadata generated from at least one user-provided image that depicts an unknown object. The method also includes providing, to the at least one processor, second metadata generated from at least one reference image of a known object. The method also includes comparing, using the at least one processor, the first metadata to the second metadata to determine difference information as between the unknown and known objects. The difference information includes at least: a first information component; a second information component; or a third information component. The first information component relates to appearance, the second information component relates to size, and the third information component is different from the first and second information components. When the difference information indicates that the unknown object is different than the known object, a first audio message is caused to be generated for delivery to the user. The first audio message includes at least some of the difference information.

According to another example embodiment, there is provided a system that includes a non-stationary camera that is configured to capture at least one first image that depicts an unknown object, and also configured to output the at least one first image for generating first metadata elsewhere within the system. The system also includes storage that is configured to store second metadata generated from at least one second image of a known object. The system also includes at least one processor that is in communication with the storage and the non-stationary camera. The at least one processor is configured to compare the first metadata to the second metadata to determine difference information as between the unknown and known objects. The difference information includes at least: a first information component; a second information component; or a third information component. The first information component relates to appearance, the second information component relates to size, and the third information component is different from the first and second information components. The system also includes a mobile communications device that includes a speaker. The mobile communications device is in communication with the at least one processor and is configured to cause the speaker to emit, when the difference information indicates that the unknown object is different than the known object, a first audio message that includes at least some of the difference information.

According to yet another example embodiment, there is provided a computer-implemented method for providing live virtual assistance to a user of the live virtual assistance. The method includes receiving, at an at least one processor: first metadata generated from a first region of at least one user-provided image that depicts a first unknown object; and second metadata generated from a second region of the at least one user-provided image that depicts a second unknown object. The method also includes providing, to the at least one processor, third metadata generated from at least one reference image of a known object. The method also includes processing the first metadata, the second metadata and the third metadata to determine, using the at least one processor, that the first unknown object is more similar than the second unknown object to the known object. The method also includes comparing, using the at least one processor, the first metadata to the third metadata to determine difference information as between the unknown and known objects. The method also includes generating a customized be on the lookout message that includes at least some of the difference information.

Each of the above-mentioned embodiments will be discussed in more detail below, starting with example system and device architectures of the system in which the embodiments may be practiced, followed by an illustration of processing blocks for achieving an improved technical method, device, and system for providing virtual assistance in facilitating visual comparison. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include humans, vehicles, animals, other entities, etc. In some example embodiments objects include both moving and stationary objects. In other example embodiments objects may include only objects that are not always stationary within the video within which they appear.

Further advantages and features consistent with this disclosure will be set forth in the following detailed description, with reference to the figures.

Referring now to the drawings, and in particular FIG. 1, which is a block diagram of a system 10. The illustrated system 10 includes a plurality of moving or non-stationary cameras $20_1$-$20_n$ (for example, body-worn cameras, police vehicle cameras, dash cameras, drone-mounted cameras, etc.) which are coupled to a network 30 (which may comprise a plurality of networks, even though shown as a single network in FIG. 1 for convenience of illustration). The network 30 can include the Internet, or one or more other public/private networks coupled together by communication elements: for example, one or more network switches 32, one or more routers 34, and/or one or more gateways 36. The network 30 could be of the form of, for example, client-server networks, peer-to-peer networks, etc. Data connections between any of the moving cameras $20_1$-$20_n$ and other network devices can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the moving cameras $20_1$-$20_n$ and one or more of the other illustrated network devices are within the same Local Area Network (LAN).

It is contemplated that the network 30 may include a Radio Access Network (RAN). RANs may operate according to an industry standard Land Mobile Radio (LMR) or cellular protocol such as, for example, the Project 25 (P25) standard defined by the Association of Public Safety Communications Officials International (APCO), the TErrestrial Trunked RAdio (TETRA) standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) including LTE-Advanced or LTE-Advanced Pro (compliant with, for example, the 3GPP TS 36 specification series), or the 5G (including a network architecture compliant with, for example, the 3GPP TS 23 specification series and a New Radio (NR) air interface compliant with the 3GPP TS 38 specification series) standard, among other possibilities, and over which Multimedia Broadcast Multicast Services (MBMS), Single-Cell Point-To-Multipoint (SC-PTM) services, or Mission Critical Push-to-talk (MCPTT) services may be provided, or over which an Open Mobile Alliance (OMA) Push To Talk (PTT) over cellular, a Voice over IP (VoIP), or a PTT over IP (PoIP) application may be implemented.

Still with reference to FIG. 1, the moving cameras $20_1$-$20_n$ communicate data and information to and from other network devices via the network 30. For instance, the moving cameras $20_1$-$20_n$ transmit video data to one or more other network devices via the network 30. As another example, the moving cameras $20_1$-$20_n$ receive control data from other network devices via the network 30. In at least some example embodiments, the moving cameras $20_1$-$20_n$ need not all be of homogeneous type, and any suitable combination of cameras of different types (i.e. a heterogeneous combination of cameras) is also contemplated.

A plurality of mobile communication devices $35_1$-$35_m$ are also included within the system 10 which, in some examples are two-way radios (each formally or informally assigned to a respective individual working within an identifiable area). The mobile communication devices $35_1$-$35_m$ communicate data and information to and from other network devices via the network 30. Also, each of the mobile communication devices $35_1$-$35_m$ includes, amongst other components, a microphone and a speaker.

Still with reference to the moving cameras $20_1$-$20_n$ and the mobile communication devices $35_1$-$35_m$, those skilled in the art will appreciate that any suitable number of the moving cameras $20_1$-$20_n$ may optionally be configured to directly transmit wireless communications to any suitable number of the mobile communication devices $35_1$-$35_m$ that may be configured to receive such wireless communications. Similarly any suitable number of the mobile communication devices $35_1$-$35_m$ may optionally be configured to directly transmit wireless communications to any suitable number of the moving cameras $20_1$-$20_n$ that may be configured to receive such wireless communications.

Also shown in FIG. 1 is a server 40 which is coupled to the network 30 to receive data and information from other devices on the network 30 such as, for example, any of the moving cameras $20_1$-$20_n$. The server 40 is also coupled to any suitable number of client devices 70 via a network 60 in order that the server 40 may, for example, send and receive data and information as between the client devices 70 and the server 40.

Regarding the network 60, this may comprise a plurality of networks even though shown as a single network in FIG. 1 for convenience of illustration. The network 60 can include the Internet, or one or more other public/private networks coupled together by communication elements: for example, one or more network switches 62, one or more routers 64, and/or one or more gateways 66. The network 60 could be of the form of, for example, client-server networks, peer-to-peer networks, etc. Data connections between any of the client devices 70 and other network devices can be any number of known arrangements for accessing a data communications network, such as, for example, dial-up SLIP/PPP, ISDN, dedicated lease line service, broadband (e.g. cable) access, DSL, ATM, Frame Relay, or other known access techniques (for example, RF links). Although in the illustrated example embodiment the network 30 and the network 60 are shown as separate, in some examples there may be some overlap and commonality between the network 30 and the network 60. In at least one example, the network 60 and the network 30 may be the same network.

Still with reference to FIG. 1, the illustrated server 40 includes a database 81 maintained within storage 83. Amongst other things, the database 81 is organized storage for images and/or video footage, video and/or other metadata, etc.

The server 40 also includes a query manager module 85 (which, for example, provides any of the client devices 70 an interface for retrieving information from the database 81), a neural network module 87 (which, for example, enables artificial intelligence functions as herein explicitly and implicitly described), a media server module 89 (which, for example, manages the transmission of stored media to the client devices 70, the moving cameras $20_1$-$20_n$, the mobile communication devices $35_1$-$35_m$, etc.), an appearance search module 90 (providing server-side appearance search functionality more details of which are described in, for example, US Pat. Publ. No. 2018/0157939 entitled "System and Method for Appearance Search"), and a video analytics module 91 (providing server-side video analytics functionality, the details of which will be understood by those skilled in the art and which may be expected to vary depending upon specifics of different suitable alternative implementations). The server 40 also includes other software components 93. These other software components will vary depending on the requirements of the server 40 within the overall system. As just one example, the other software components 93 might include special test and debugging software, or software to facilitate version updating of modules within the server 40.

Figure 2:
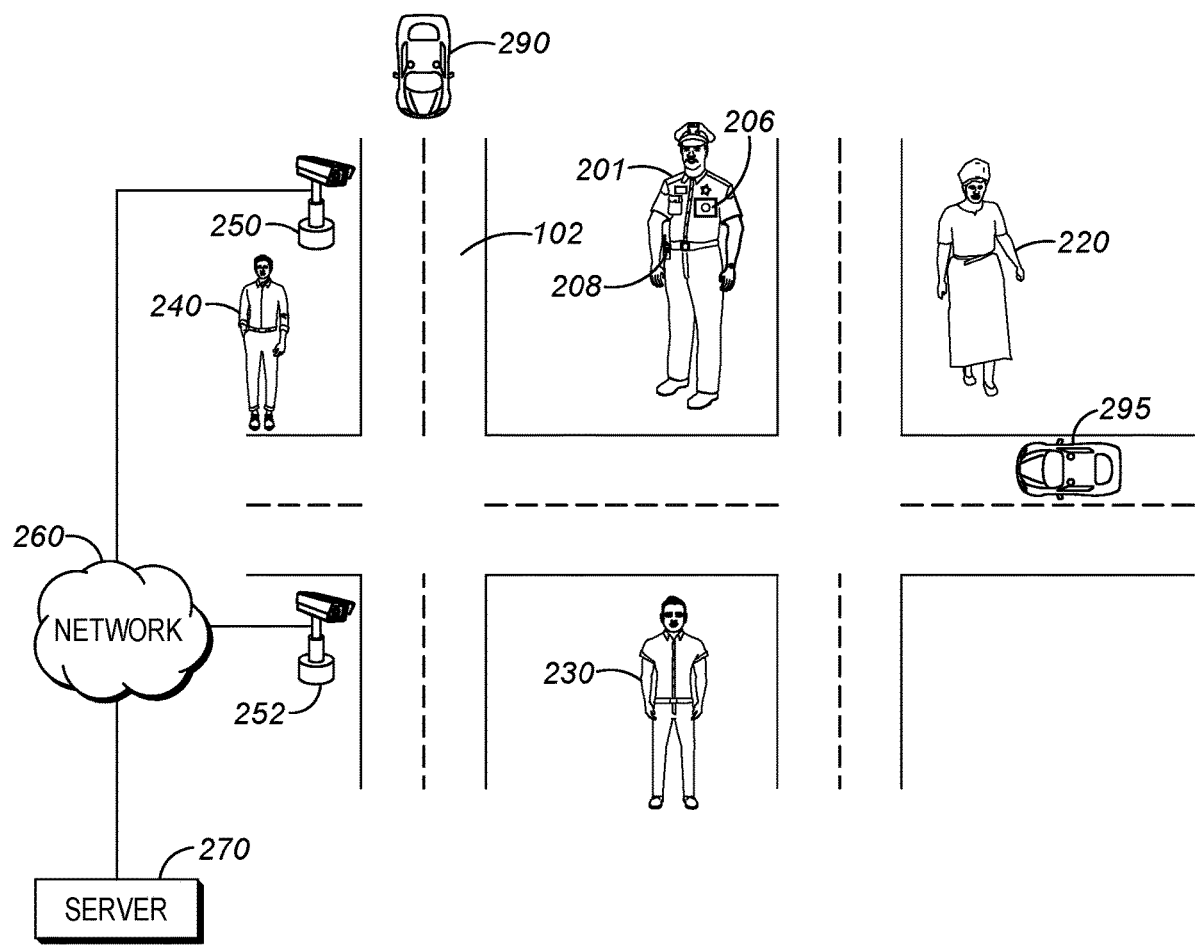
FIG. 2 is a schematic diagram of a practical implementation, in accordance with example embodiments, of the system of FIG. 1.

Reference is now made to FIG. 2. FIG. 2 is a schematic diagram of a practical implementation, in accordance with example embodiments, of the system of FIG. 1. In the illustrated example implementation, a police officer 201 is on patrol within a geographic region 203. The police officer 201 is carrying a body-worn camera 206, which may correspond to one of moving cameras $20_1$-$20_n$, and a two-way radio 208 (shown in more detail in FIG. 3) which may correspond to one of the mobile communication devices $35_1$-$35_m$. Amongst other things, the two-way radio 208 includes a display screen 209, a speaker 210 and a microphone 211.

Figure 3:
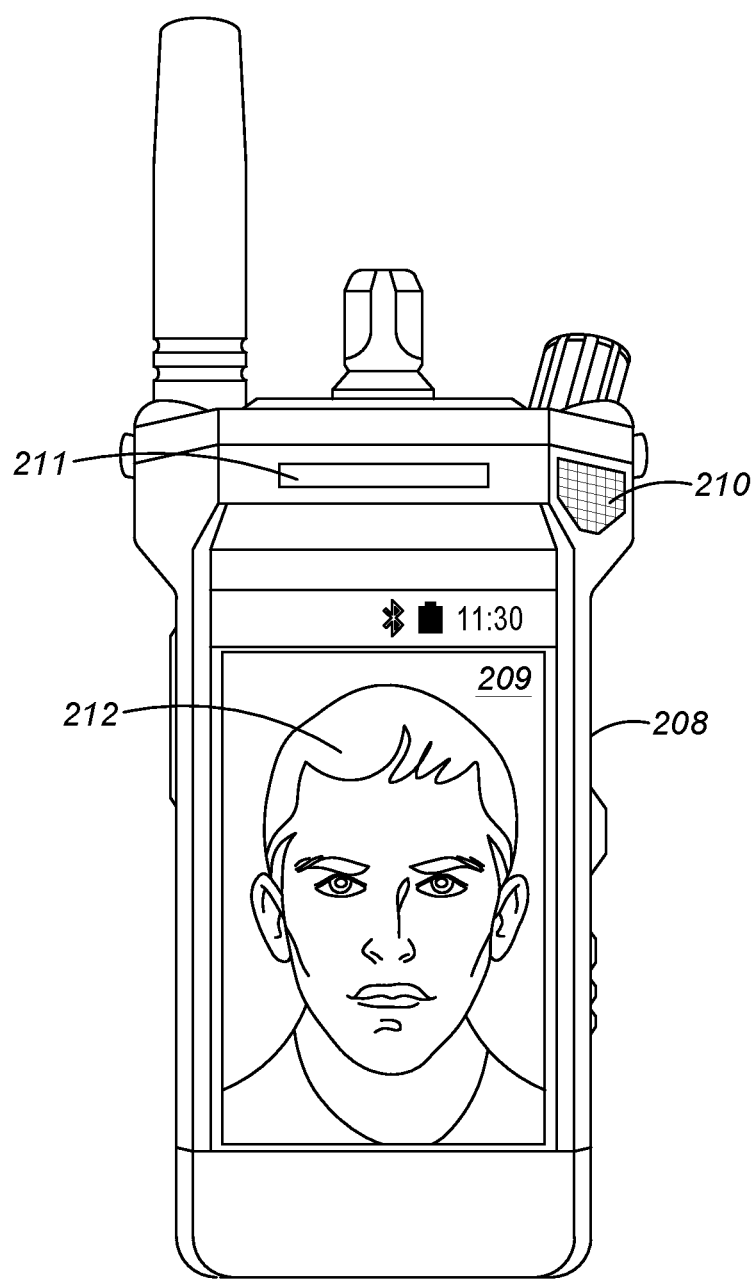
FIG. 3 is an example two-way radio that may be used in example embodiments.

In accordance with at least one example, the police officer 201 receives a BOLO on the two-way radio 208. As shown in FIG. 3, this BOLO includes an image 212 of a person of interest that the police officer 201 is tasked to try and find. The police officer 201 may, for instance, look at the image 212 and commit the shown physical characteristics of the person of interest to memory. In at least one example, the image 212 is a mug shot of a suspect.

Referring once again to FIG. 2, shown are three people 220, 230 and 240 within close visual distance from the police officer 201. In accordance with the illustrated example, the police officer 201 will observe each of the three people 220, 230 and 240. Starting first with the person 220, the police officer 201 may immediately determine (i.e. without automated assistance) that the person 220 does not match the subject of the BOLO. For example, the police officer 201 may immediately notice that the gender of the person 220 does not match the subject of the BOLO (i.e. the person 220 is not a male individual).

Next, the police officer 201 may observe the person 230 who, for the purposes of this illustrated example, has more similar physical characteristics to the subject of the BOLO as compared to the previously observed person 220. Here the police officer 201 may seek automated assistance and, in this regard, reference is now made to FIG. 4.

Figure 4:
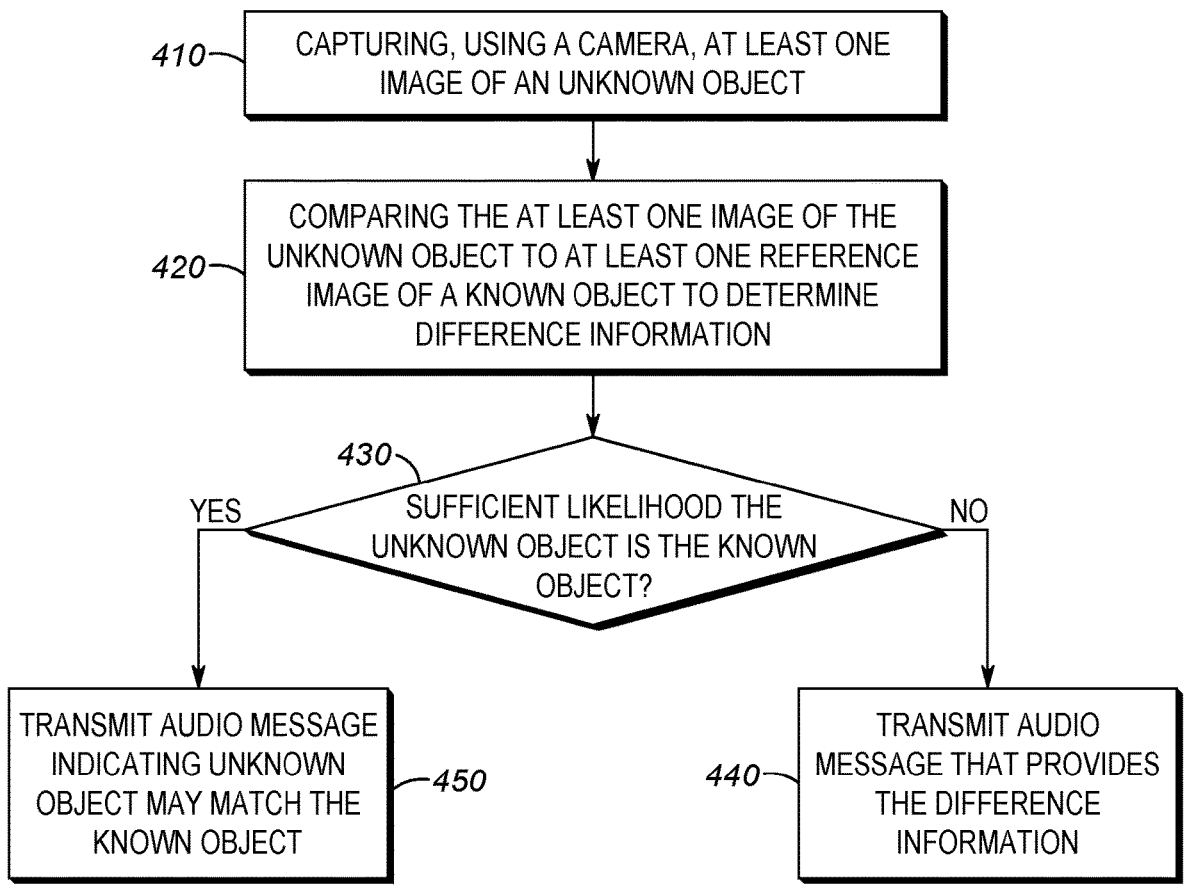
FIG. 4 is a flow chart illustrating a method for automated object comparison assistance in accordance with an example embodiment.

FIG. 4 is a flow chart illustrating a method 400 for automated object comparison assistance in accordance with an example embodiment. First, at least one image of an unknown object is captured (410) using a camera. For instance, the police officer 201 may point his body-worn camera 206 towards the person 230 and capture video footage (a plurality of images) of the person 230.

Next, the at least one image of the unknown object is compared (420) against at least one reference image of a known object to determine difference information. For example, the video footage of the person 230 captured by the body-worn camera 206 may be transmitted through the network 30 to the server 40, and then subsequently the appearance search module 90 operates cooperatively with the neural network module 87 and the video analytics module 91 to compare one or more images of the person 230 against one or more reference images of the subject of the BOLO. Resultant from this comparison is difference information.

Next, it is determined (430) whether or not (based on the images comparison described above) there is sufficient likelihood that the unknown object is the known object. If "NO", action 440 follows. If "YES", action 450 follows.

With continuing reference to the practical implementation of FIG. 2, following comparison of the video footage of the person 230 captured by the body-worn camera 206 to reference image(s), it may be determined that the person 230 is not sufficiently similar to the subject of the BOLO. Accordingly and consistent with the action 440, an audio message that provides the difference information may be transmitted to the police officer 201. For instance, a speaker of the two-way mobile radio 208 may emit the audio message. Other forms of audio delivery to the police officer 201 are contemplated. For instance, the police officer 201 may have a Bluetooth™ earpiece that emits the audio message into an ear of the police officer 201. Also, it will be understood that any suitable audio message that delivers the difference information in a manner that helps police officer 201 understand why the person 230 is not a potential match. As just one example amongst many, the audio message in relation to the person 230 may be: "The person is too tall. The person of interest is about a head shorter than this person."

Still with reference to the practical implementation of FIG. 2, say that the police officer 201 moves on to capture video footage of the next person, namely the person 240. Following comparison of the video footage of the person 240 captured by the body-worn camera 206 to reference image(s), it may be determined that the person 240 is sufficiently similar to the subject of the BOLO. In accordance with the action 450, an audio message may delivered (in any of the manners previously herein described) to the police officer 201 indicating that the person 240 may be a match to the subject of the BOLO. Accordingly an appropriate action may be taken by the police officer such as, for example, approaching the person 240 if it is permissible for him to do so by himself.

Also within the geographic region 203 are two stationary security cameras 250 and 252. In accordance with some examples, the security cameras 250 and 252 can be used in combination with the body-worn camera 206 to capture additional video images of any one or more of the people 220, 230 and 240 for comparisons with reference images as has been herein described. The security cameras 250 and 252 are communicatively connected to a network 260 (which may be similar to the network 30 shown in FIG. 1). The network 260 is communicatively connected to a server 270 (which may be similar to the server 40 shown in FIG. 1).

Also within the geographic region 203 are two vehicles 290 and 295 which drive on highways, streets and the like (such as, for example, paved road 102). The methods and teachings herein described in relation to people can be extended to vehicles with suitable modifications such as, for example, using License Plate Recognition (LPR) to compare license plates (as comparing, for instance, faces in the case of people).

Figure 5:
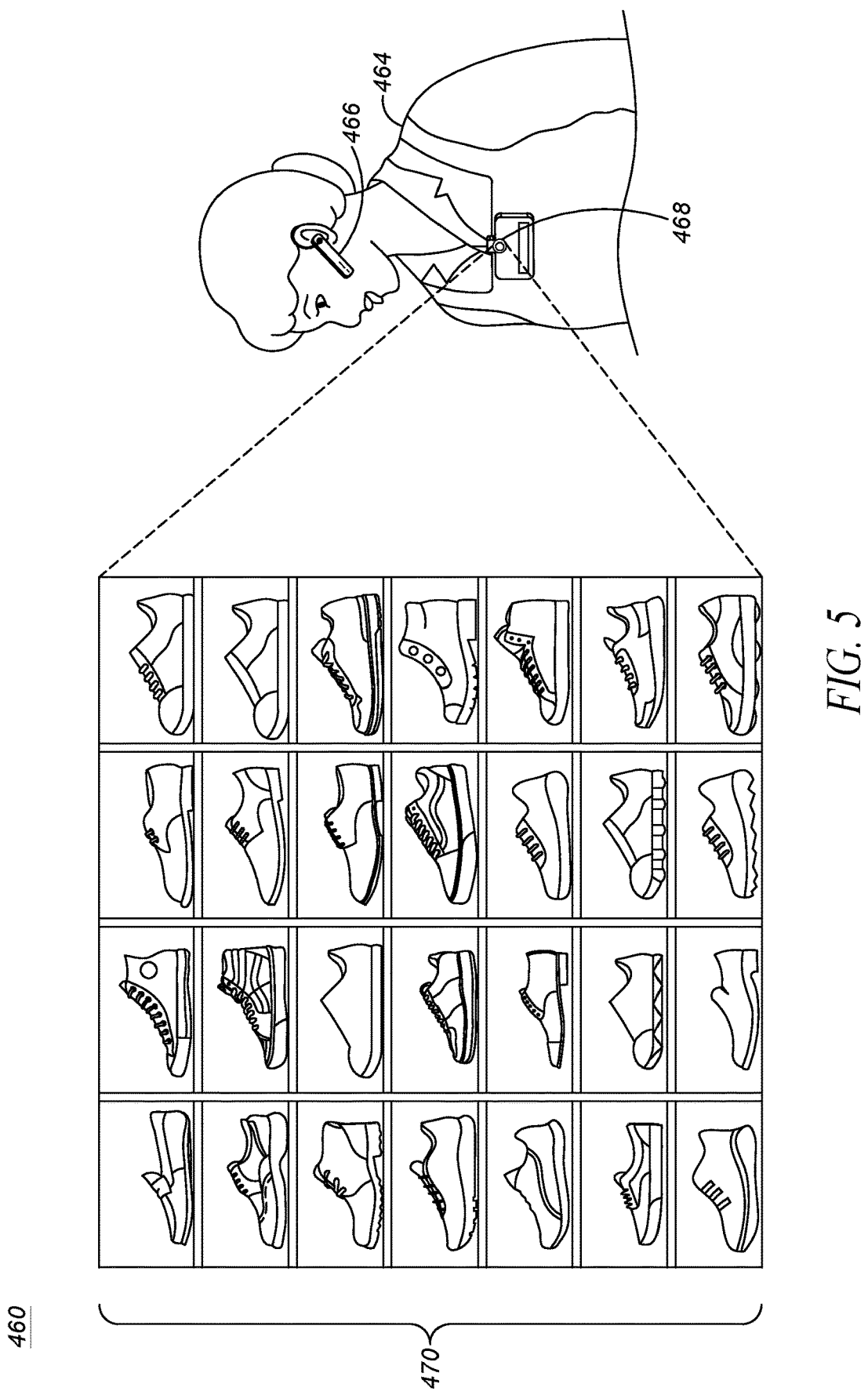
FIG. 5 is another schematic diagram of another practical implementation, in accordance with another example embodiment consistent with the method of FIG. 4.

Example embodiments are not limited to merely safety or security-related applications. Referring to FIG. 5, shown is a schematic diagram of a store 460 within which the method 400 may be carried out in accordance with an example embodiment. Store employee 464 is equipped with a Bluetooth™ earpiece 466 and a body-worn camera 468. The employee 464 can operate the earpiece 466 and a body-worn camera 468 in a manner similar to as was described in relation to similar devices which may be worn by the police officer 201 (FIG. 2); however instead of searching for the subject of a BOLO, instead the employee 464 of this illustrated example embodiment is searching for a specific shoe amongst a wall of shoes 470. Difference information may be provided in relation to any one or more of the shoes on the wall as compared to a particular specific shoe of interest. Also, those skilled in the art will appreciate that appearance search technology as it relates to moving objects is presently well commercialized. Extending appearance search technology to stationary, inanimate objects like shoes, paintings etc. can be achieved through suitable conventional modifications and instructive guidance from teachings accessible to those skilled in the art such as, for example, teachings found the 2015 non-patent literature entitled "Stationary Object Detection in Video" by Filip Leiding.

Figure 6:
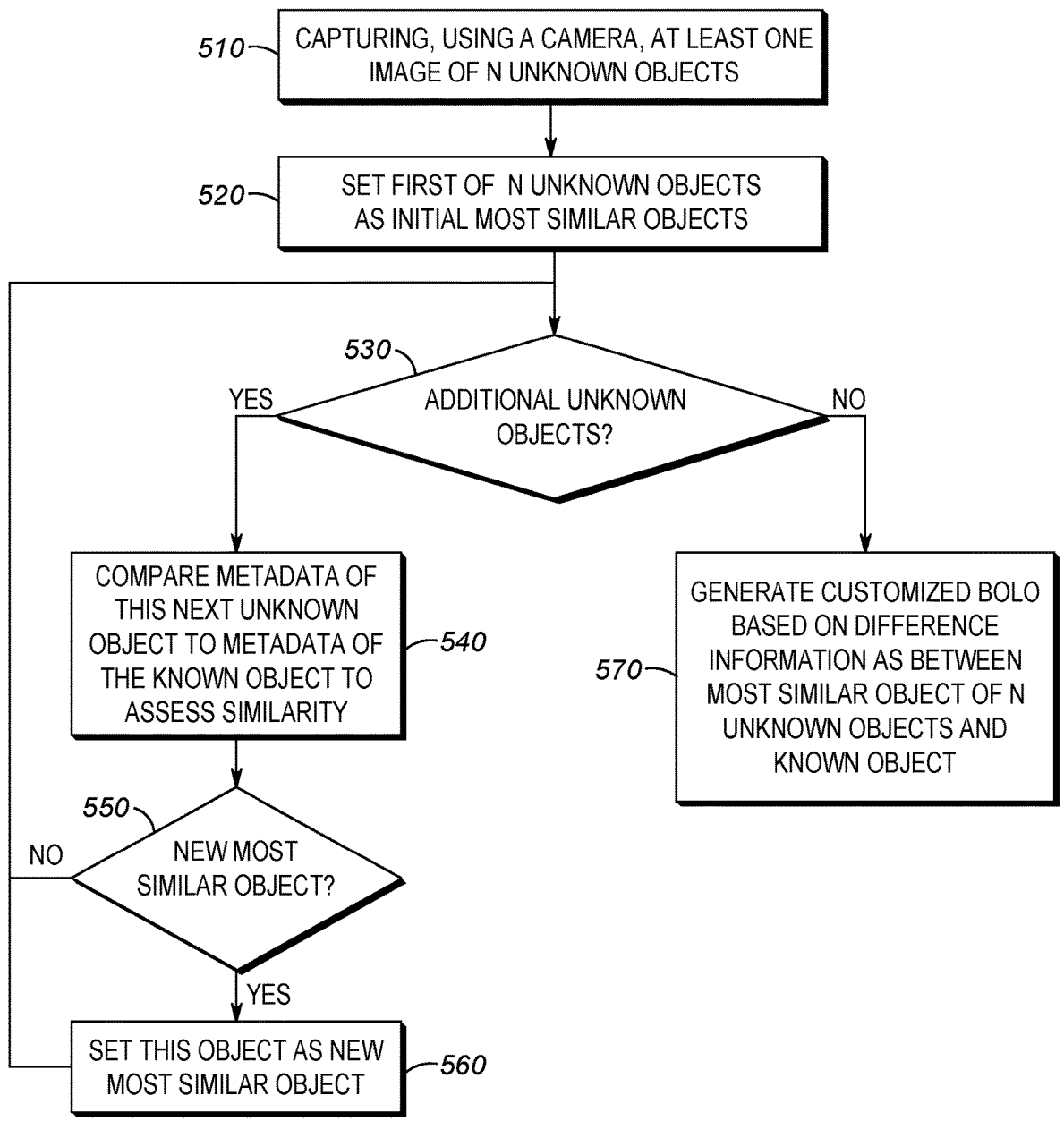
FIG. 6 is a flow chart illustrating another method for automated object comparison assistance in accordance with another example embodiment.

Continuing on, reference is now made to FIG. 6. FIG. 6 is a flow chart illustrating a method 500 for automated object comparison assistance in accordance with another example embodiment. First, at least one image, within which are n unknown objects, is captured (510) using a camera. For instance, the police officer 201 shown in FIG. 2 may point his body-worn camera 206 towards both the person 220 and the person 230 (i.e. making the assumption that these two people may come to be sufficiently close to each other in order for both to be within a common field of view of the body-worn camera 206) and the body-worn camera 206 thus captures video footage (a plurality of images) of the two people. (In this example n equals two; however it will be understood that n may be any suitable integer greater than zero.)

Next in the method 500, a first of the n unknown objects is set (520) as an initial most similar object. For example, the person 220 may, by arbitrary assignment, be a "first" unknown object, and thus set to the initial object that is most similar to the known object (the known object may be the person shown in the image 212 of FIG. 3, for example).

Next is decision action 530, namely whether or not there are further unknown objects to assess. If "YES", action 540 follows, where metadata of the next unknown object is compared against metadata of the known object to assess similarity. So with continuing reference to the aforementioned two people example, the person 230 is the next unknown object. Thus, metadata for the person 230 is compared against metadata for the known person corresponding to the image 212.

Next, it is determined (550) whether or not the person assessed in the previous action 540 is a new most similar object. For example, is the person 230 more similar to the known person than the person 220. If the object assessed in the previous action 540 is not a new most similar object, then the decision action 530 follows. If however the object assessed in the previous action 540 is a new most similar object, then this object is set (560) as the new most similar object, and then the decision action 530 follows the action 560.

With reference once again to the decision action 530, action 570 follows "NO" (no more unknown object to assess). In regards to the action 570, this is generation of a customized BOLO based on difference information as between the most similar object of the n unknown objects and the known object. For example, a message along the lines of the following might be delivered to the two-way radio 208 of the police officer 201: "Officer John, please be on the lookout for a person of interest that looks similar to that man in front of you in the red t-shirt. The person of interest is about a head shorter than that man."

It will be appreciated that variations on the method 500 are contemplated. For example, instead of the BOLO message being tailored based on a single object-to-object comparison, a BOLO message tailored based on a plurality of object-to-object comparisons is also contemplated.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and also, among other features and functions set forth herein, it will be understood that well designed computer vision may provide more reliable comparison of images as compared to achievable limits of normal human vision).

In the foregoing specification, specific embodiments have been described. However, one of ordinary skill in the art appreciates that various modifications and changes can be made without departing from the scope of the invention as set forth in the claims below. For example, at least some of the modules herein described as forming part of the server 40 may alternatively be found, in whole or in part, in one or more of the edge devices of the system 10 such as, for example, one or more of the moving cameras $20_1$-$20_n$, or one or more of the mobile communication devices $35_1$-$35_m$.

Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more Application Specific Integrated Circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a LAN or a Wide Area Network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
   a non-stationary camera configured to:
   capture at least one first image that depicts an unknown object; and
   output the at least one first image for generating first metadata elsewhere within the system;
   storage configured to store second metadata generated from at least one second image of a known object; and
   at least one processor in communication with the storage and the non-stationary camera, the at least one processor configured to:
   compare the first metadata to the second metadata to determine difference information as between the unknown and known objects, the difference information including at least one of a first information component and a second information component, wherein the first information component relates to appearance, and the second information component relates to size; and
   a mobile communications device that includes a speaker, the mobile communications device in communication with the at least one processor and configured to cause the speaker to emit an audio message that: includes at least some of the difference information; indicates that the unknown object is different than the known object; and explains why, consistent with the at least some of the difference information, there is no match between the unknown object and the known object.

2. The system as claimed in claim 1 wherein the known object is a person and a third information component relating to facial features is included in the difference information.

3. The system as claimed in claim 1 wherein the known object is a vehicle and a third information component relating to License Plate Recognition (LPR) is included in the difference information.

4. The system as claimed in claim 1 wherein the at least one first image is a plurality of video frames captured by the non-stationary camera.

5. The system as claimed in claim 1 wherein the second information component relating to size includes one or more of a height delta and a weight delta.

6. The system as claimed in claim 1 wherein the known object is an identifiable article for sale in a store.

7. The system as claimed in claim 1 wherein the mobile communications device further includes a display screen, and the at least one processor is further configured to cause the at least one second image to be delivered to mobile communications device for display on the display screen.

8. The system as claimed in claim 7 wherein the mobile communications device is a two-way radio or smart phone wirelessly connectable to at least one wireless network.

9. The system as claimed in claim 7 wherein the at least one second image includes a mug shot of a suspect.

10. The system as claimed in claim 1 wherein the audio message includes words that descriptively detail only the at least one of the first information component and the second information component.

11. A computer-implemented method for providing live virtual assistance to a user of the live virtual assistance, the method comprising:
   receiving, at an at least one processor, first metadata generated from at least one user-provided image that depicts an unknown object;
   providing, to the at least one processor, second metadata generated from at least one reference image of a known object;
   comparing, using the at least one processor, the first metadata to the second metadata to determine difference information as between the unknown and known objects, the difference information including at least one of a first information component and a second information component, wherein the first information component relates to appearance, and the second information component relates to size; and
   causing an audio message to be generated for delivery to the user, and
   wherein the audio message: includes at least some of the difference information; indicates that the unknown object is different than the known object; and explains why, consistent with the at least some of the difference information, there is no match between the unknown object and the known object.

12. The computer-implemented method as claimed in claim 11 wherein the known object is a person and a third information component relating to facial features is included in the difference information.

13. The computer-implemented method as claimed in claim 11 wherein the known object is a vehicle and a third information component relating to License Plate Recognition (LPR) is included in the difference information.

14. The computer-implemented method as claimed in claim 11 wherein the at least one user-provided image is a plurality of video frames captured by a moving camera.

15. The computer-implemented method as claimed in claim 11 wherein the second information component relates to one or more of a height delta and a weight delta.

16. The computer-implemented method as claimed in claim 11 wherein the known object is an inanimate article and a third information component relating to categorization of the inanimate article in relation to one or more store inventories is included in the difference information.

17. The computer-implemented method as claimed in claim 11 further comprising causing the at least one reference image to be delivered to a mobile device of the user.

18. The computer-implemented method as claimed in claim 17 wherein the mobile device is a two-way radio or smart phone wirelessly connected over at least one network to a server that stores the at least one reference image.

19. The computer-implemented method as claimed in claim 11 wherein the audio message includes words that descriptively detail only the at least one of the first information component and the second information component.

20. A computer-implemented method for providing live virtual assistance to a user of the live virtual assistance, the method comprising:

receiving, at an at least one processor:

first metadata generated from a first region of at least one user-provided image that depicts a first unknown object; and second metadata generated from a second region of the at least one user-provided image that depicts a second unknown object;

providing, to the at least one processor, third metadata generated from at least one reference image of a known object;

processing the first metadata, the second metadata and the third metadata to determine, using the at least one processor, that the first unknown object is more similar than the second unknown object to the known object;

comparing, using the at least one processor, the first metadata to the third metadata to determine difference information as between the first unknown object and the known object; and generating a customized be on the lookout message that includes at least some of the difference information, and explains why, consistent with the at least some of the difference information, there is no match between the first unknown object and the known object.

* * * * *